Figure 1:
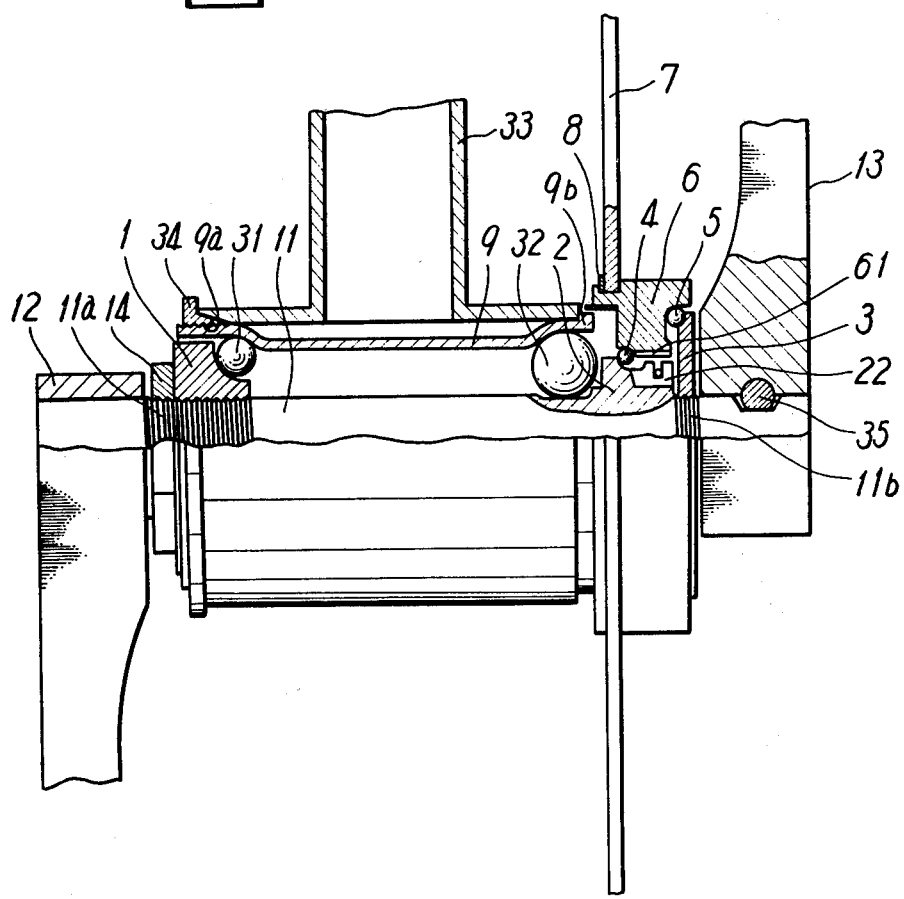

United States Patent [19]

Segawa et al.

[11] 4,150,859
[45] Apr. 24, 1979

[54] CHAIN WHEEL AND CRANK FOR A BICYCLE

[75] Inventors: Takashi Segawa; Hitoshi Katayama, both of Sakai, Japan

[73] Assignee: Shimano Industrial Company, Ltd., Osaka, Japan

[21] Appl. No.: 887,803

[22] Filed: Mar. 17, 1978

Related U.S. Application Data

[63] Continuation of Ser. No. 729,847, Oct. 5, 1976, abandoned.

[30] Foreign Application Priority Data

Oct. 17, 1975 [JP]  Japan .................................. 50-142048

[51] Int. Cl.² .............................................. F16C 3/04
[52] U.S. Cl. .................................. 308/23.5; 74/217 B; 301/105 B; 308/179.5; 308/192

[58] Field of Search .................. 301/105 B; 74/217 B, 74/594.1, 594.2, 217 S; 192/5, 4 C, 64, 46, 6; 308/23.5, 179.5, 183, 192, 191, 189, 190, 194

[56] References Cited

U.S. PATENT DOCUMENTS

| 1,288,956 | 12/1918 | Miller | 308/192 |
|---|---|---|---|
| 3,492,883 | 2/1970 | Maeda | 74/217 B |

Primary Examiner—Douglas C. Butler
Attorney, Agent, or Firm—Stevens, Davis, Miller & Mosher

[57] ABSTRACT

A bicycle chain wheel and crank of three pieces, namely a crank shaft and a pair of crank arms. The crank shaft freely rotatably supports the chain wheel through a cone, so that the crank is easy and inexpensive to manufacture. The crank arms can be of common shape because a chain wheel mounting boss does not have to be formed on the crank arm.

1 Claim, 3 Drawing Figures

CHAIN WHEEL AND CRANK FOR A BICYCLE

This application is a continuation of Ser. No. 729,847 filed Oct. 5, 1976, now abandoned.

This invention relates to a chain wheel and crank for a bicycle and more particularly to a chain wheel (to be hereinafter called a gear) and crank for a bicycle, which crank comprises three pieces, namely a crank shaft and a pair of crank arms fixed to both ends of the crank shaft.

Conventionally, this kind of chain wheel and crank is so constructed that the gear is fixed to one of crank arms to be rotatable in normal and reverse rotation of the crank shaft. In the chain wheel and crank of the bicycle, a driving chain pulled across the gear and the freewheel, attached to a rear wheel, stops travelling when the crank stops rotating. Accordingly, when a derailleur, for example, is used for changing the bicycle speed by switching the driving chain to the multistage freewheel, cessation of crank rotation on a slope or the like causes the chain to stop travelling which creates a problem in that the derailleur can not effect the speed change.

For solving the above problem, U.S. Pat. No. 3,492,883 has suggested that between the chain gear and one of the crank arms is insertably mounted a unidirectionally rotatable transmission so that the crank may transmit its rotation to the gear only when rotated in a normal direction, i.e., in the forward direction of bicycle movement, thereby rotating the gear in the normal direction. On the other hand, only the crank rotates when it rotates in the reverse direction, and further only the gear may rotate when normally rotated by the chain travelling due to forward rotation of the wheel even if the crank is not rotating, thereby making it possible to change the bicycle's speed by the chain travelling as a result of wheel rotation even if the the crank is not rotating.

The chain gear and crank, which are so constructed that one of a pair of crank arms separate from the crank shaft, is formed with a boss to which a well-known cone carrying the freewheel is mounted with a set screw or the like, are difficult to assemble and require a boss protruding from the crank arm to be connected with the cone so that one of the crank arms differs considerably in shape from the other. As a result, the crank is complex in the manufacturing process and expensive to manufacture due to necessity of its independent process.

In view of the above problems, the invention has been designed. An object of the invention is to provide a chain gear and crank which are simply constructed to assemble the gear with the crank in freely rotatable relation.

The invention is directed to provide a crank comprising three separate pieces, namely a crank shaft and a pair of crank arms. The crank shaft is provided with a cone for freely rotating the gear. At the outer periphery of the cone, a cylindrical driven member carrying the gear is freely rotatably supported through bearings and a unidirectionally rotatable transmission is insertably mounted between the cone and the driven member so that the driven member, and in its turn the front gear, may be supported freely rotatably with respect to the crank shaft, whereby the gear is easy to assemble and the crank arm fixed to one end at the gear mounting side of the crank shaft is not required to have a boss projecting therefrom so as to be ready to manufacture and also the crank arms at both ends of the crank shaft can be made common in shape.

The above and other objects and features of the invention will be apparent from the following description, reference being had to the accompanying drawings wherein a preferred form of the present invention is clearly shown.

Figure 2:
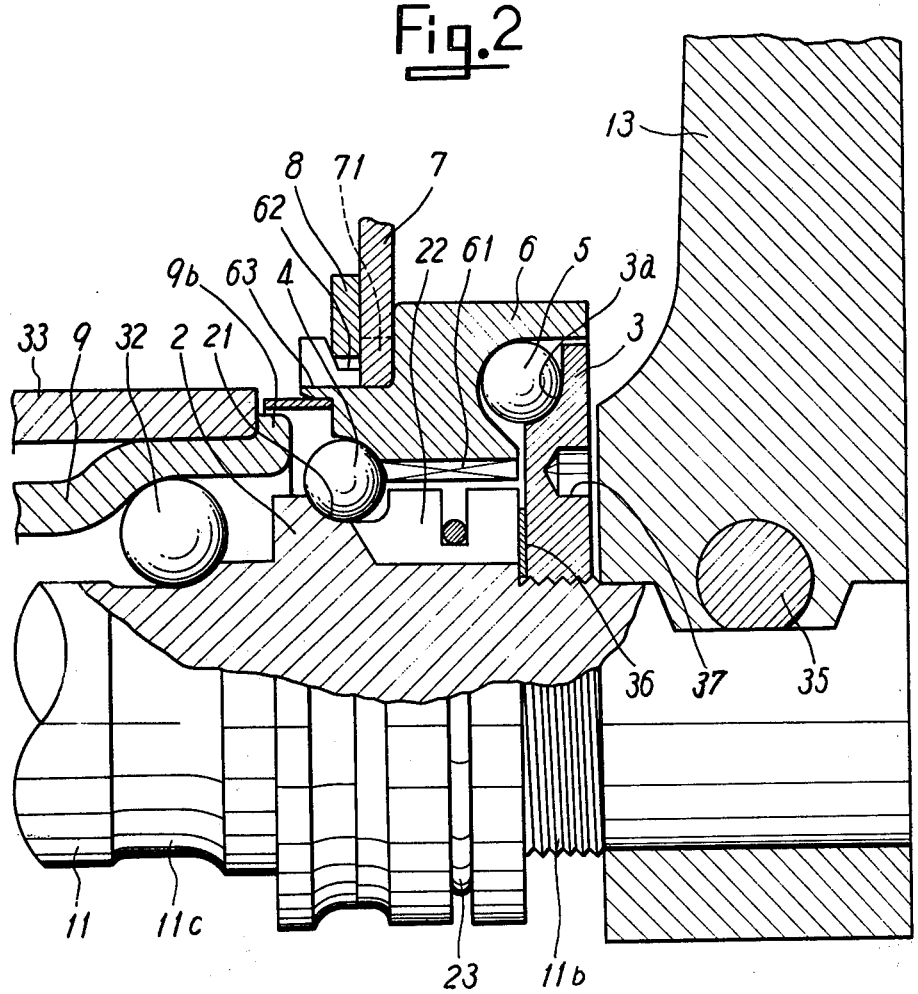
Figure 3:
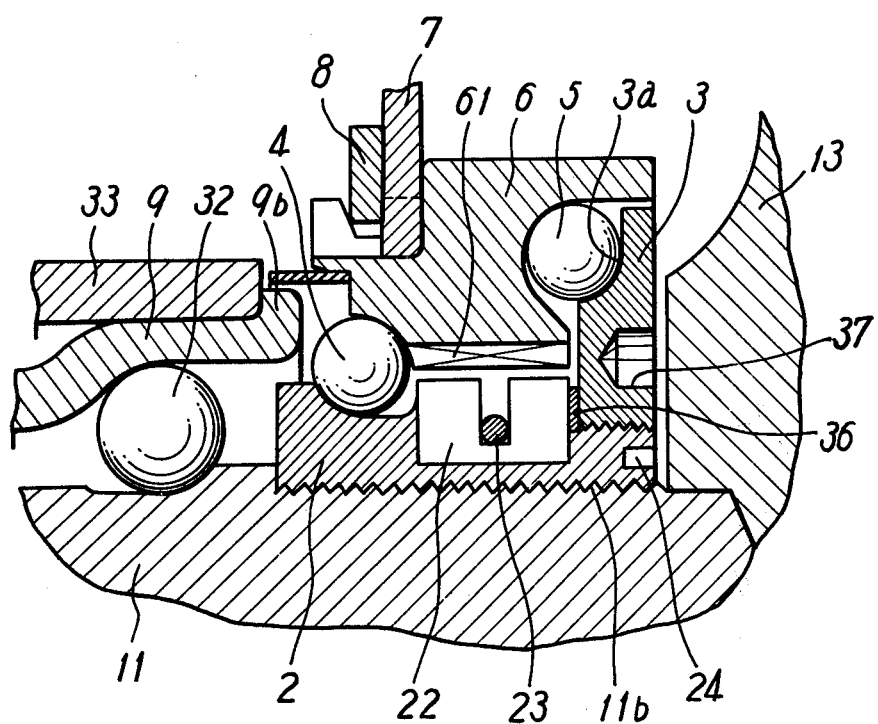

In the drawings:

FIG. 1 is a partially cutaway front view of the chain gear and crank of the invention mounted to the bottom bracket of the bicycle, FIG. 2 is an enlarged sectional view of a principal portion thereof, and FIG. 3 is an enlarged sectional view of a principal portion of a modified embodiment corresponding to that in FIG. 2.

Referring to the drawings, the reference numeral 11 designates a crank shaft of given length. The crank shaft 11 has a pair of crank arms 12 and 13 fixed at both ends of the shaft so as to build up a crank body.

The crank shaft 11 is provided at the outer periphery of both axial ends thereof with screw threads 11a and 11b. The screw thread 11a at the one crank arm 12 mounting side of the crank shaft is screwed wth a ball holder 1 and a jam nut 14 for securing the ball holder 1. At the other crank shaft 13 mouting side of the crank shaft is formed an annularly protruding cone 2 integrated with the crank shaft 11. The screw thread 11b is screwed with a ball holder 3.

The cone 2 is integrated with the crank shaft 11, has a ball race 21 formed at the outer periphery of one axial end of the cone and pawls 22 at the outer periphery of the other axial end, and rotatably supports a cylindrical driven member 6 through balls 4 and 5 carried with the ball race 21 of the cone 2 and a ball race 3a of the ball holder 3.

The driven member 6 has at its outer periphery a front gear 7 attached thereto and at the inner periphery ratchet teeth 61 in mesh with the pawls 22. The ratchet teeth 61 and the pawls 22 form a unidirectionally rotatable transmission. The unidirectionally rotatable transmission transmits only one directional rotation of the crank shaft 11 from the driven member 6 to the front gear 7 so that the latter may be freely rotatable when the crank shaft 11 stops rotation or rotates in the other direction.

The front gear 7 is fixed to the driven member 6 in such a manner that the latter is, as shown in FIG. 2, provided at its outer periphery with an annular groove 62 and an axially extending guide groove 63, and the front gear 7 is provided with an inwardly extending projection 71 insertable into the guide groove 63 so as to be guided into the annular groove 62 by passing the projection 71 through the guide groove 63 and be secured with a snap ring 8. Alternatively, the front gear may be calked to the driven member 6, or locked with a screw. In addition, the front gear 7 may be single or plural.

Referring to the drawings, the reference numeral 9 designates a cylindrical body, which is sleeved onto the crank shaft 11, is supported to the crank shaft through balls 31 and 32 carried by a ball race of the ball holder 1 and a ball race 11c at the crank arm 13 mounting side of the crank shaft 11. At the outer periphery of one end of the cylindrical body 9 is provided screw thread 9a and at the outer periphery of the other end side is provided a notched portion 9b. The notched portion 9b abuts the annular edge of the bottom bracket 33 of the bicycle frame and the screw thread 9a is screwed with a jam nut 34, thereby securing the cylindrical body 9 to the bottom bracket 33. Thus, the crank body is readily mountable on the bracket 33 in freely rotatable relation therewith by means of the formed cylindrical body 9.

In the above construction, the bottom bracket 33 is inwardly tapered on the inner periphery of one end thereof at the side of the the crank arm 12 and the jam nut 34 for locking the bottom bracket is tapered on the outer periphery thereof to be engageable with the tapered surface of the tube end of the bottom bracket 33, whereby the bracket can be centered and the cylindrical body 9 can be more rigidly secured to the bottom bracket 33.

The reference numeral 23 designates a ring spring for holding the pawls, reference numeral 37 designates a bore formed at the ball holder 3 for controlling rotation thereof, reference numeral 35 designates a cotter pin, and reference numeral 36 designates a spacer.

Other than integrated with the crank shaft 11, in the aforesaid embodiment, the cone 2 may, as shown in FIG. 3, be separate from but integrally connected as a unit by being screwed to the crank shaft 11. If the ball holder 3 is screwed to the cone 2, then a bore 24 is provided for controlling the cone 2.

Now the function of the chain gear and crank of the invention will be described. When the crank shaft 11 is normally rotated by pedalling the crank arms, the cone 2 rotates together with the crank shaft 11, and the driven member 6 and the front gear 7 integrally rotate with the crank shaft 11 through the pawls 22 and ratchet teeth 61 so as to drive the bicycle wheel through the driving chain. When reversely rotated only the crank shaft 11 rotates and its rotation is not transmitted to the driven member.

When the rider stops rotating the crank arms 12 and 13 the crank shaft 11 stops rotating also. However, the wheels of the bicycle may continue to rotate. When the wheels of the bicycle rotate the rear hub rotates which in turn rotates a rear gear, thus causing the driving chain to travel with the rear gear and hub. With the driving chain travelling the front gear 7 is rotated thereby which in turn rotates driven member 6.

The rotation of driven member 6 is not transmitted to the cone 2 so that only the front gear and driven member 6 are rotated.

This function enables the front gear 7 to rotate even without pedalling of the crank arms 12 and 13, thereby making it possible to change the bicycle speed by the derailleur.

Furthermore, front gear 7 does not rotate when crank shaft 11 reversely rotates by reverse pedalling which is used for braking action by a coaster brake hub serving as the rear hub and having the multistage freewheel attached thereto.

In greater detail, either one of the crank arms 12 and 13 or the crank shaft 11 is provided with a wire or rod so that the wire or rod may, when the crank shaft reversely rotates, be operable to be pulled for controlling a clutch cone of the coaster brake hub through the wire or rod thereby effecting the braking action.

As clearly understood from the aforesaid description, the chain gear and crank of the invention comprise the so-called three-piece-type crank formed of the crank shaft and a pair of crank arms. The crank shaft is provided with the cone which carries therewith the front gear. In other words, the front gear is freely rotatably supported to the crank shaft, so that the chain gear and crank are easy to assemble, and there is no need for the crank arm at the front gear mounting side to be provided with a boss protruding from the arm. In addition, both crank arms can be made common in shape. Accordingly, the chain gear and crank are easy and inexpensive to manufacture, and capable of effecting the speed change when the crank stops rotation in the bicycle's running on a slope or the like because the freely rotatable front gear enables the driving chain to travel even if the crank is not rotating.

While a preferred embodiment of the invention has been described using specific terms, such description is for illustrative purpose only, and it is to be understood that changes and variations may be made without departing from the spirit or scope of the following claims.

What is claimed is:

1. A chain wheel and a crank for a bicycle including a bottom bracket, said chain wheel and crank comprising:
   a rotatable crank shaft;
   a first crank arm separate from and fixed to one axial end of said crank shaft;
   a second crank arm separate from said first crank arm and said crank shaft and fixed to the other axial end of said crank shaft;
   a first cone integral with said crank shaft and disposed at said one axial end of said crank shaft;
   a second cone disposed about said other axial end of said crank shaft;
   a cylindrical body attachable to said bottom bracket with said first and second cones through bearings supporting said cylindrical body;
   a cylindrical drive member having an inner diameter greater than the outer diameter of said first cone;
   a ball holder screwably mounted on said first cone;
   said chain wheel being positioned on the outer periphery of said cylindrical driven member;
   a pair of bearings between said driven member, the ball holder and said first cone, said pair of bearings supporting said driven member in freely rotatable relation relative to said first cone and ball holder; and
   a unidirectionally rotatable transmission positioned between the pair of bearings for transmitting the rotation of said crank shaft from said first cone to said driven member in only one direction of rotation.

* * * * *